(12) United States Patent
Hosoya et al.

(10) Patent No.: US 6,725,175 B1
(45) Date of Patent: Apr. 20, 2004

(54) APPARATUS AND METHOD FOR DIAGNOSING SLIDING MODE CONTROL SYSTEM

(75) Inventors: Hajime Hosoya, Atsugi (JP); Kenichi Machida, Atsugi (JP)

(73) Assignee: Unisia JECS Corporation, Kanagawa-ken (JP)

( * ) Notice: Subject to any disclaimer, the term of this patent is extended or adjusted under 35 U.S.C. 154(b) by 441 days.

(21) Appl. No.: 09/702,721

(22) Filed: Nov. 1, 2000

(30) Foreign Application Priority Data

Nov. 1, 1999 (JP) ............................. 11-311557

(51) Int. Cl.[7] ........................... G01K 25/00; G06F 11/30
(52) U.S. Cl. ........................................ 702/183; 702/113
(58) Field of Search ................................. 702/183, 113, 702/114, 115; 123/90.15; 701/101, 102, 103, 111

(56) References Cited

U.S. PATENT DOCUMENTS 6,188,953 B1 * 2/2001 Yasui et al. ................ 701/109
6,192,311 B1 * 2/2001 Yasui et al. ................ 701/113

FOREIGN PATENT DOCUMENTS

| JP | 3-78802 | 4/1991 |
| JP | 10-141022 | 5/1998 |
| JP | 11-2140 | 1/1999 |

OTHER PUBLICATIONS

Kenzou Nonami, et al. "Sliding Mode Control—a theory of design of non–liner robust control", published by Corona Publishing Co., Ltd., Oct. 1994.

* cited by examiner

*Primary Examiner*—Marc S. Hoff
*Assistant Examiner*—Paul L Kim
(74) *Attorney, Agent, or Firm*—McDermott, Will & Emery

(57) ABSTRACT

In a sliding mode control system to feedback control a control object amount to a target value by calculating an operation amount based on a non-linear term calculated corresponding to a switching function and a linear term, an abnormality judgment signal is output when an operation amount by the non-linear term does not change within a predetermined time from when a predetermined period of time has elapsed after the target value has changed.

10 Claims, 12 Drawing Sheets

APPARATUS AND METHOD FOR DIAGNOSING SLIDING MODE CONTROL SYSTEM

BACKGROUND OF THE INVENTION

1. Field of the Invention

The invention relates to an apparatus and a method for diagnosing a system malfunction in a sliding mode control system, for example, of a type used for the feedback control in a valve timing control apparatus of an internal combustion engine.

As a valve timing control apparatus constituted to successively and variably change the opening and closing timing of intake and exhaust valves by changing a rotation phase of a camshaft relative to a crankshaft, a vane type valve timing controlling apparatus as disclosed in Japanese Unexamined Patent Publication 10-141022 is conventionally known.

In the conventional valve timing apparatus mentioned above, when a rotation phase can not be controlled to a target value, the result is a deterioration of the operating performance of an engine. Therefore, the conventional valve timing apparatus is provided with a diagnosis apparatus for diagnosing an abnormality in control function of the rotation phase. When the occurrence of an abnormality is diagnosed, a fail-safe process is performed.

The above diagnosis apparatus judges whether there is an abnormality, for example, based on control errors of a time when a predetermined period of time has elapsed after a target value of the rotation phase has changed.

However, in the above valve timing apparatus, sometimes there occurs a stationary deviation, since it is difficult to control an actual rotation phase (valve timing) to a target value with accuracy due to fluctuation in angle velocity of the camshaft and fluctuation in oil temperature and oil pressure.

Accordingly, in view of prevention of misdiagnosis, it is needed to set the above conventional diagnosis to judge an abnormality when relatively large control errors occur, and time is required to adapt the judgment level.

Further, in the conventional feedback control by proportional, integral and differential operations, it is desirable that a feedback gain is set to be variable in accordance with the oil temperature and the oil pressure, to improve response characteristic. However, since gain matching is not easily performed, consideration is made to shift to a sliding mode control that is hardly influenced by disturbance.

2. Summary of the Invention

In view of the foregoing, the present invention has been accomplished and has an object of providing an apparatus and a method for diagnosing a system abnormality with high accuracy and with a little adaptation time in a feedback control system using a sliding mode control.

For achieving the above object, with the present invention, in a sliding mode control system where an operation amount is calculated based on a non-linear term calculated corresponding to a switching function and a linear term, to feedback control a control object amount to a target value, the constitution is such that an abnormality judgment signal of the sliding mode control system is output based on a variation in the operation amount within a predetermined time from when a predetermined period of time has elapsed after the target value has changed.

More specifically, when the operation amount by the non-linear term does not change within a predetermined time from when a predetermined period of time has elapsed after the target value has changed, an abnormality judgment signal of the sliding mode control system is output.

When the system is normal, since the operation amount by the non-linear term performs a switching function when the control object amount is approaching the target value after changed, the presence of system abnormality is judged based on whether or not the switching function occurs.

The switching function of the operation amount by the non-linear term may be judged based on a change of code of the operation amount by the above non-linear term.

In the case the linear term is consisted of an operation amount in proportion to a control deviation and an operation amount in proportion to a change velocity of the control object amount, the constitution may be such that when the operation amount in proportion to the change velocity of the control object amount does not change within a predetermined time from when a predetermined period of time has elapsed after the target value has changed, an abnormality judgment signal the sliding mode control system is output.

When the system is normal, since the operation amount by the non-linear term performs a switching function when the control object amount is approaching the target value after changed, and the control object amount changes with such switching function, so that the above change velocity changes, the abnormality can be judged based on the change of the operation amount in proportion to the change velocity.

The diagnosis apparatus and method according to the present invention, can be applied to a system for feedback controlling a valve timing in a variable valve timing apparatus in an internal combustion engine to a target value using a sliding mode control.

The other objects and features according to the present invention will be apparent from the following explanation of preferred embodiments with reference to the accompanying drawings.

DESCRIPTION OF THE PREFERRED EMBODIMENTS

Figure 1:
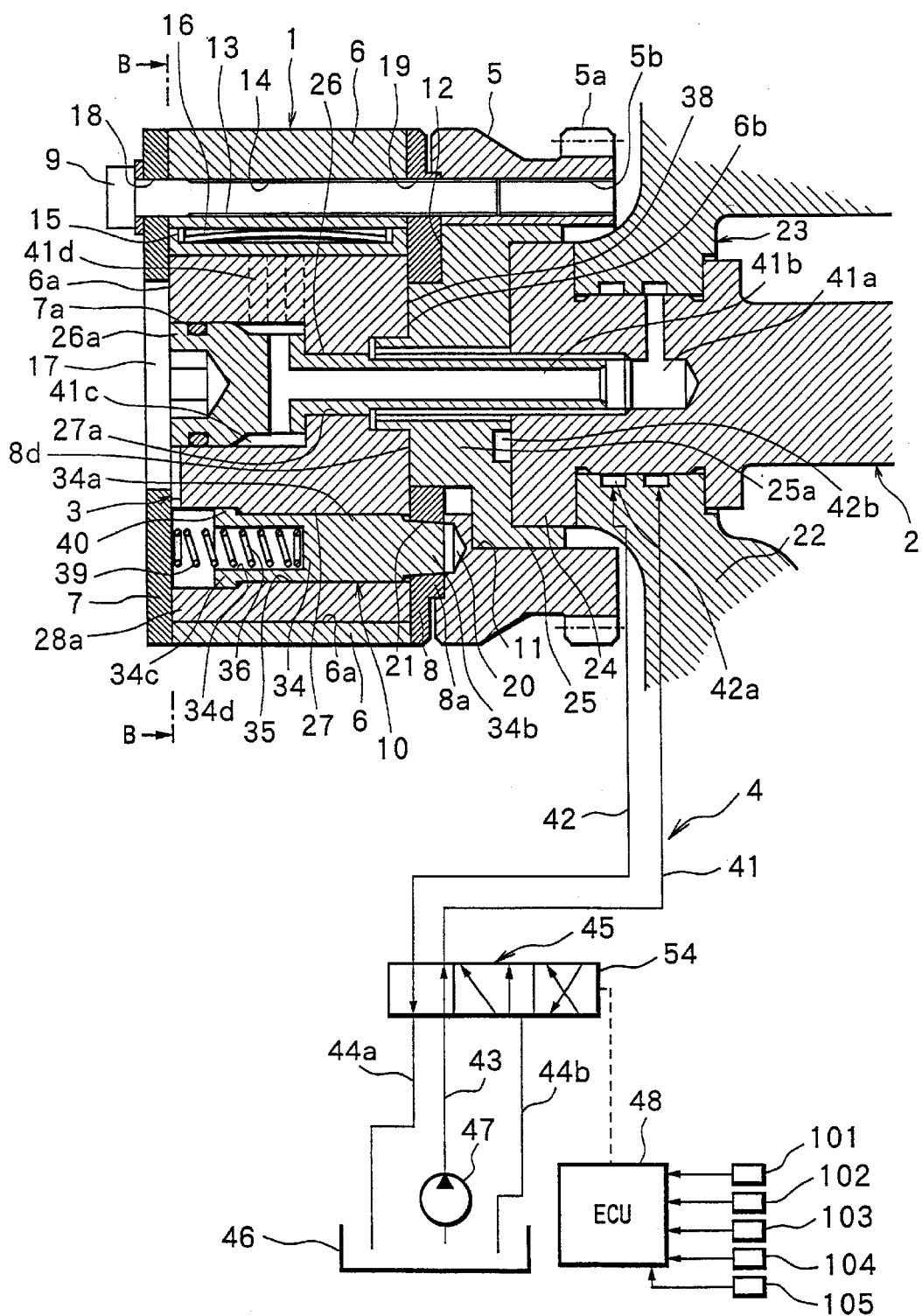
FIG. 1 is a sectional view of a valve timing control mechanism in one embodiment.
Figure 2:
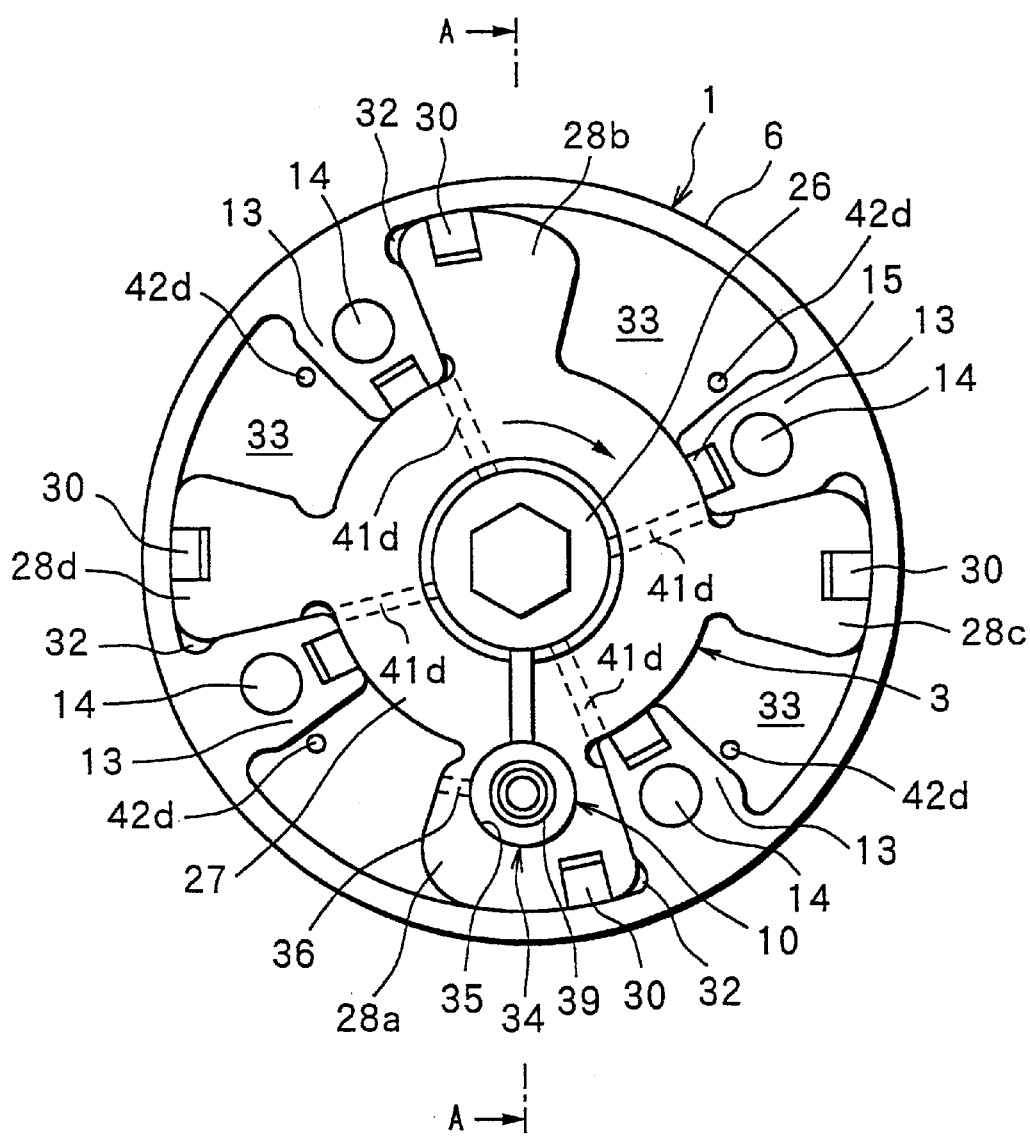
FIG. 2 is a sectional view taken along the line B—B in FIG. 1.
Figure 3:
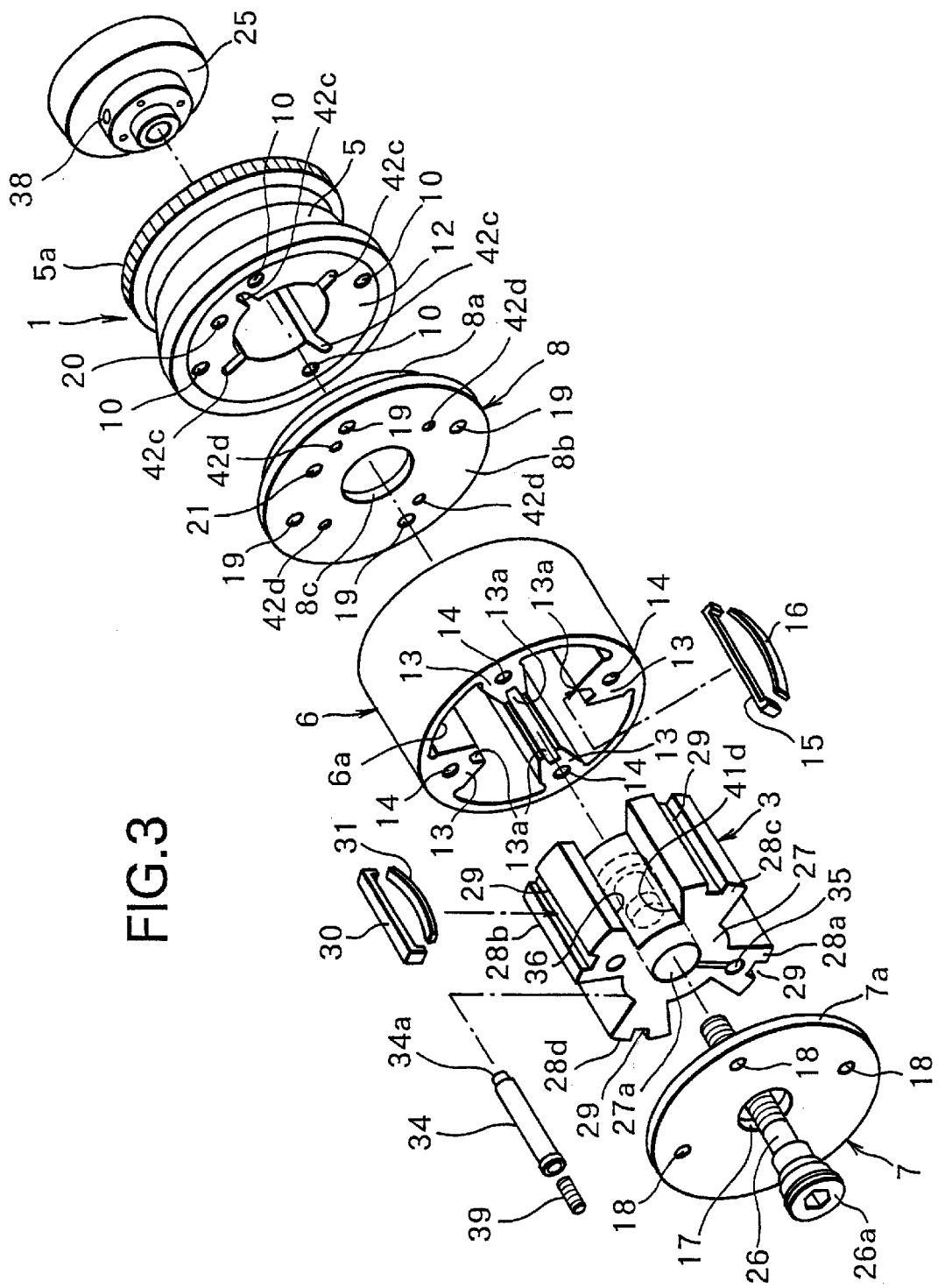
FIG. 3 is an exploded perspective view of the valve timing control mechanism.

FIG. 1 to FIG. 6 show mechanical portions of a valve timing control apparatus in an internal combustion engine to be feedback controlled by an operation amount based on a sliding mode control. In the present embodiment, the mechanical portions are applied to an intake valve side.

The valve timing control apparatus as shown in the figures is equipped with a cam sprocket 1 (timing sprocket) driven to rotate through a timing chain by a crankshaft (not shown) of an engine, a camshaft 2 mounted to be rotatably relative to the cam sprocket 1, a rotation member 3 fixed to an end of the camshaft 2 to be received rotatably in the cam sprocket 1, an oil pressure circuit 4 for rotating the rotation member 3 relative to the cam sprocket 1 and a lock mechanism 10 for selectively locking a relative rotation position of the cam sprocket 1 and the rotation member 3 at a predetermined position.

The cam sprocket 1 includes a rotation portion 5 having a tooth portion 5a on the periphery thereof with which the timing chain (or timing belt) meshes, a housing 6 disposed in the front of the rotation portion 5 to rotatably receive the rotation member 3, a disc-shaped front cover 7 which functions as a lid for closing a front end opening of the housing 6 and a substantially disc-shaped rear cover 8 disposed between the housing 6 and the rotation portion 5 to close a rear end of the housing 6. The rotation portion 5 is joined integrally with the housing 6, the front cover 7 and the rear cover 8 by four small diameter bolts 9 in an axial direction.

The rotation portion 5 has a substantially annular shape on which four female screw holes 5b are through formed in the front-rear direction at equally spaced positions of 90 degrees in its peripheral direction. The small diameter bolts 9 are screwed to these female screw holes 5b. Also, in the internal and central position of the rotation portion 5, a stepped fitting hole 11 is through formed, to fit therein a sleeve 25 for forming a passage to be described later. Moreover, at the front end face of the rotation portion 5, a disc-shaped fitting groove 12 is formed in which the rear cover 8 is fitted.

The housing 6 has a cylindrical shape with the front and rear ends open, and at 90-degree positions in the peripheral direction of the inner peripheral surface thereof, four partition walls 13 are formed projectingly. The partition walls 13 have trapezoidal shapes in cross section and are disposed along the axial direction of the housing 6. Both ends of each wall 13 are in the same plane with both ends of the housing 6. At the base end side of the housing 6, four bolt through holes 14 are through formed in the axial direction and the small diameter bolts 9 are inserted therein. Further, at the central position of the internal face of each wall 13, a cut-out retaining groove 13a is formed within which a C-shaped sealing member 15 and a plate spring 16 urging the sealing member 15 inwards are fittedly held.

Further, the front cover 7 is formed with a relatively large diameter bolt through hole 17 at the center thereof and four bolt through holes 18 at the positions corresponding to the respective bolt through holes 14 in the housing 6.

The rear cover 8 is formed with a disc portion 8a held fittedly within the fitting groove 12 of the rotation portion 5 at the rear end face thereof. The cover 8 also has an insert hole 8c into which a small diameter annular portion 25a is inserted at the center thereof and further four bolt through holes 19 at the positions corresponding to the bolt through holes 14.

The camshaft 2 is supported rotatably through a cam bearing 23 at the tip end portion of a cylinder head 22, and at a predetermined position in the outer peripheral surface of the camshaft 2, a cam (not shown in the figures) is integrally mounted to open an intake valve through a valve lifter and a flange portion 24 is integrally mounted to the front end portion of the camshaft 2.

The rotation member 3 is fixed to the front end portion of the camshaft 2 through a fixing bolt 26 inserted in the axial direction through the sleeve 25 with the front and rear ends thereof fitted in the flange portion 24 and the fitting hole 11, respectively. The rotation member 3 is equipped with an annular base portion 27 having a bolt through hole 27a receiving the fixing bolt 26 at the center thereof and with four vanes 28a, 28b, 28c, and 28d integrally mounted at 90 degree positions in the outer peripheral surface of the base portion 27.

Each of the first to fourth vanes (28a~28d) has a substantially inverted trapezoidal shape in cross section and is disposed in the concave portion between each of partition walls 13 to partition the concave portion in front and rear of the rotation direction. An advance angle side pressure chamber 32 and a retard angle side oil pressure chamber 33 are defined between both sides of vanes 28a~28d and both side faces of partition walls. A sealing member 30 with C-shape sliding contact with an inner surface 6a of the housing 6 and a plate spring 31 urging the sealing member 30 outwards are fittedly held in a retaining groove 29 cut-out in the axial direction at the center of the peripheral surface of each of vanes 28a~28d.

The lock mechanism 10 includes an engagement groove 20 formed at a predetermined position at the outer peripheral side of the fitting groove 12 of the rotation portion 5, a tapered engagement hole 21 through formed at a predetermined position of the rear cover 8 corresponding to the engagement groove 20, a hole for sliding 35 through formed along the internal axial direction at the substantially central position of one of vanes 28 corresponding to the engagement hole 21, a lock pin 34 disposed slidably in the hole for sliding 35 of the one of the vanes 28, a coil spring 39 disposed in compressive state at the rear end side of the lock pin 34 and an oil pressure-receiving chamber 40 is formed between the lock pin 34 and the hole 35.

The lock pin 34 includes an intermediate diameter lock body 34a at the center thereof, a conical engagement portion 34b with its front head being smaller in diameter at the front end side of the lock body 34a and a stepped large diameter stopper portion formed on the rear end side of the lock body 34a. The lock pin 34 is urged in the direction of the engagement hole 21 by the spring force of the coil spring 39 disposed in compressive state between the bottom surface of an internal concave groove 34d and the inner end surface of the front cover 7. The lock pin 34 slides in a direction to be taken out from the engagement hole 21 by the oil pressure of the oil pressure receiving chamber 40 defined between an outer peripheral surface between the body 34a and the stopper portion 34c, and the inner surface of the hole for sliding 35. This chamber 40 is communicated with the retard angle side oil pressure chamber 33 through a through hole 36 formed in the side portion of the vane 28. The engagement portion 34b of the lock pin 34 is engaged with the engagement hole 21 at the maximum retard angle side rotation position.

The oil pressure circuit 4 includes two lines of the oil pressure passages, that is, a first oil pressure passage 41 which supplies and discharges oil pressure to the advanced angle side oil pressure chamber 32 and a second oil pressure passage 42 which supplies and discharges oil pressure to the retard angle side oil pressure chamber 33. Each of the oil pressure passages 41, 42 is connected with a supply passage 43 and a drain passage 44 through an electromagnetic switching valve 45 for passage switching. The supply passage 43 is equipped with an oil pump 47 for supplying oil from an oil pan 46 under pressure while a downstream end of the drain passage 44 is connected with the oil pan 46.

The first oil pressure passage 41 includes a first passage portion 41a formed in an inter-axis passing from the cylinder head 22 to the camshaft 2, a first oil path 41b which passes in the axial direction inside the fixing bolt 26 and branches in the head portion 26a to communicate with the first passage portion 41a, an oil chamber 41c formed between a small diameter outer peripheral surface of the head portion 26a and an inner peripheral surface of a bolt through hole 27a in the base portion 27 of the rotation member 3 to communicate with the first oil path 41b, and four branch paths 41d formed radially in the base portion 27 of the rotation member 3 to communicate with the oil chamber 41c and each of advanced angle side oil pressure chambers 32.

The second oil pressure passage 42 includes a second passage portion 42a formed in the cylinder head 22 and in an inner side of the camshaft 2, a second oil path 42b formed in a substantially L-shape inside the sleeve 25 to communicate with the second passage portion 42a, four oil passage grooves 42c formed at an outer peripheral side hole edge of the engagement hole 11 of the rotation member 5 to communicate with the second oil path 42b, and four oil holes 42d formed at approximately 90 degree positions in a circumferential direction of the rear cover 8 to communicate each of the oil passage grooves 42c with the retard angle side oil pressure chamber 33.

In the electromagnetic switching valve 45, a spool valve body of the valve 45 performs switching control of each of the oil pressure passages 41, 42 and the supply passage 43 and the drain passages 44a, 44b relatively. Further, the electromagnetic switching valve 45 is switchingly operated by a control signal from a controller 48.

Figure 4:
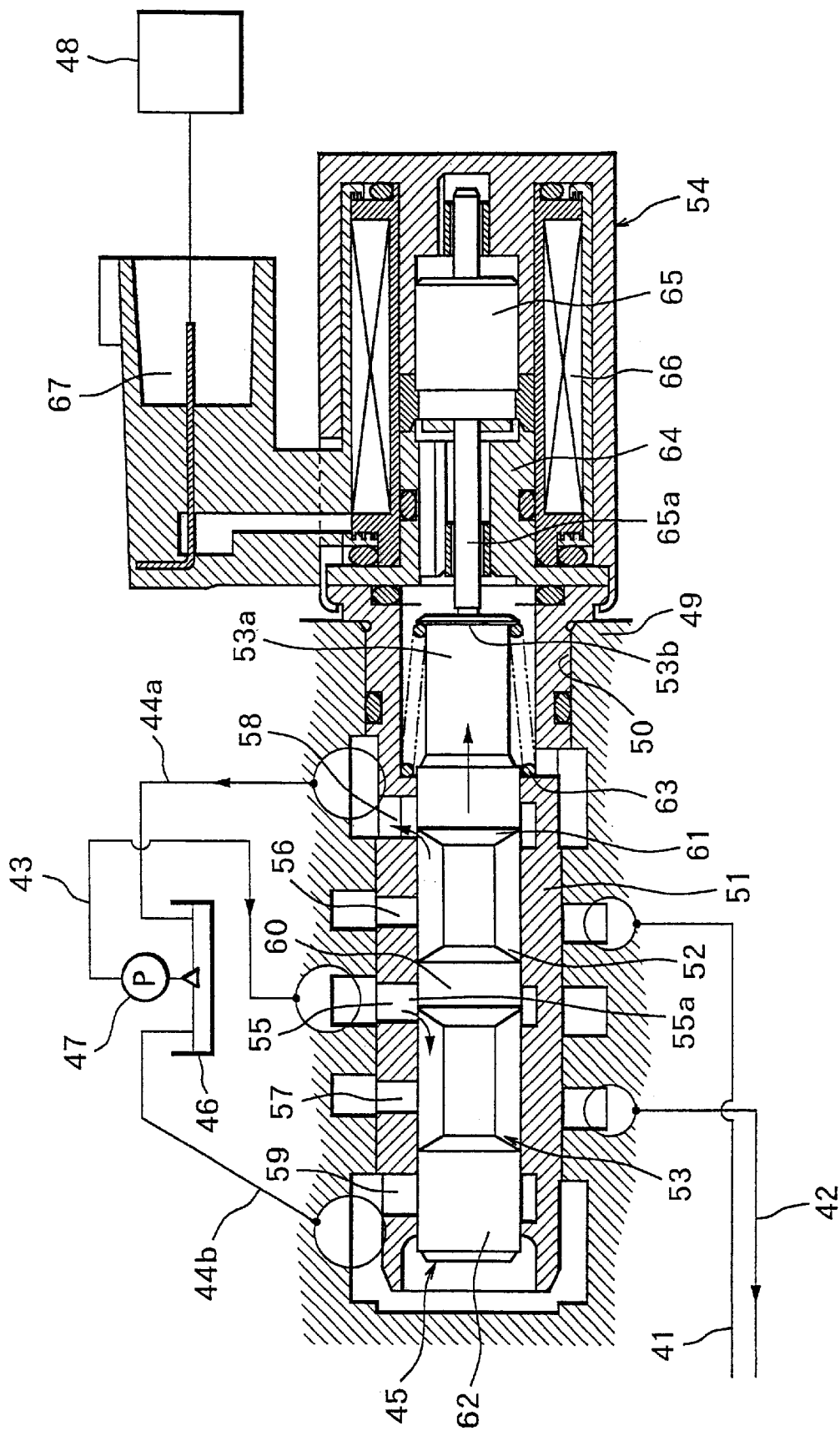
FIG. 4 is a longitudinal sectional view showing an electromagnetic switching valve in the valve timing control mechanism and a position of a spool valve in an off-control position.
Figure 5:
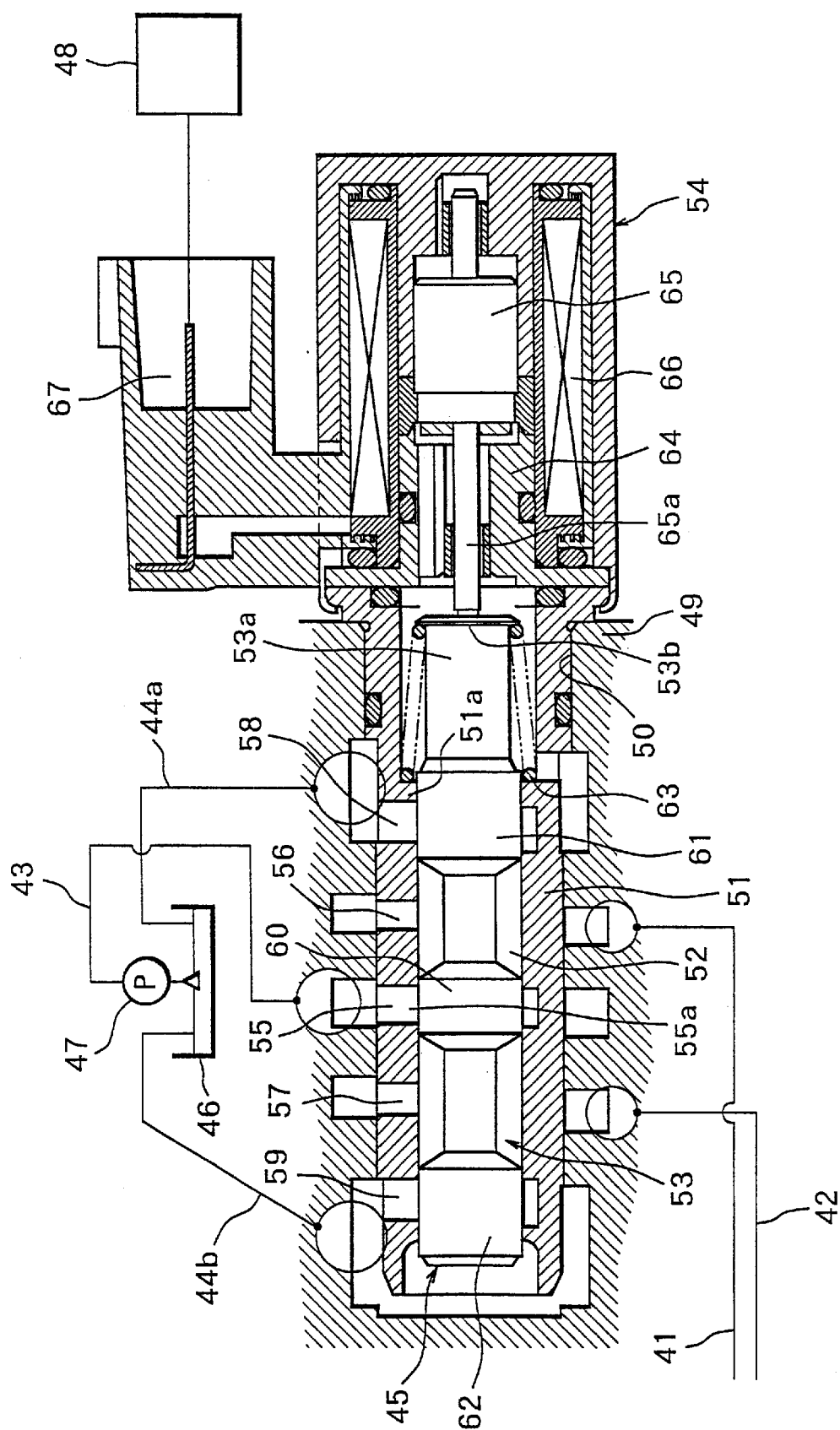
FIG. 5 is a longitudinal sectional view showing the electromagnetic switching valve in the valve timing control mechanism and a position of a spool valve in a neutral-control position.
Figure 6:
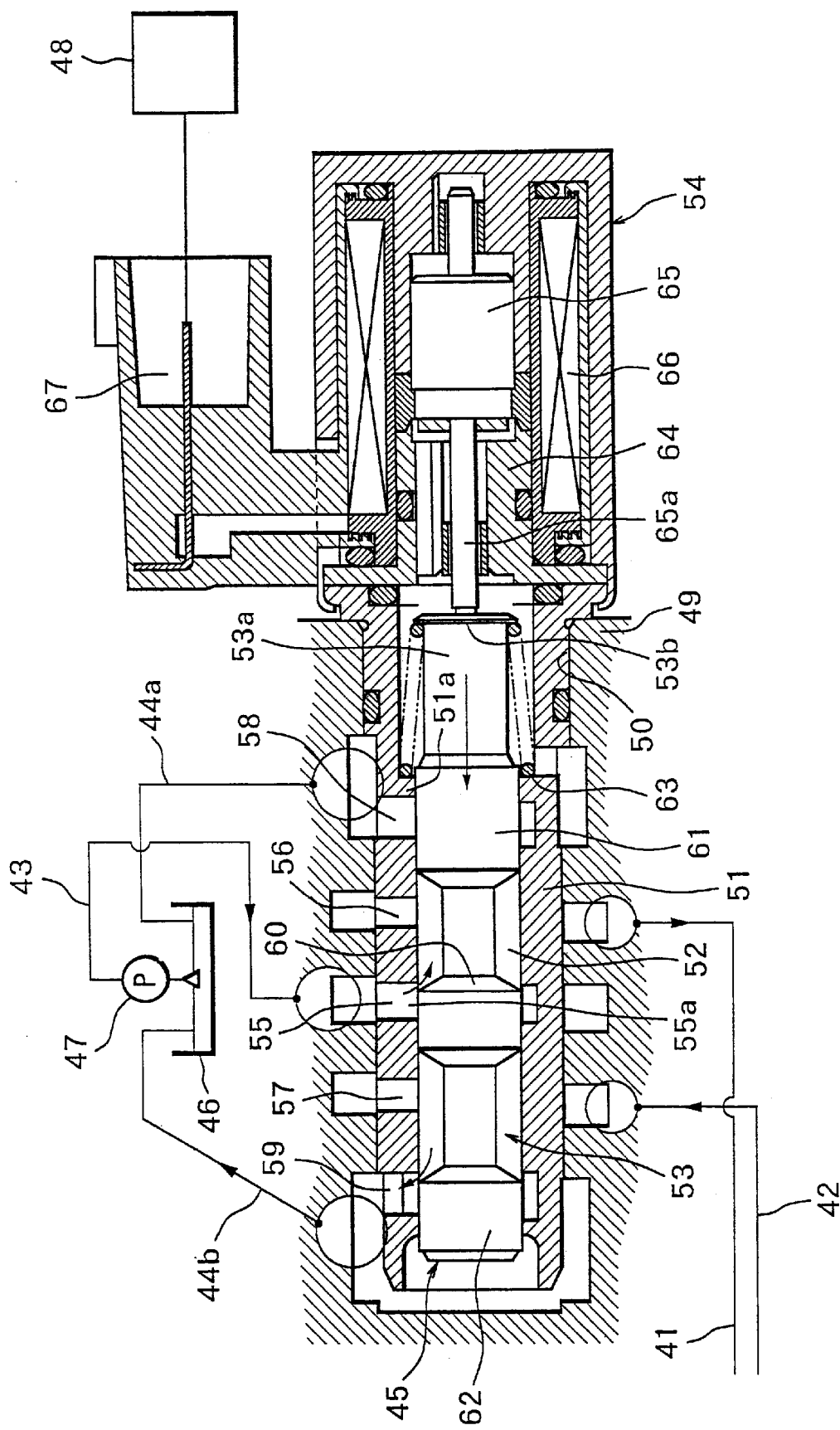
FIG. 6 is a longitudinal sectional view showing the electromagnetic switching valve in the valve timing control mechanism and a position of a spool valve in an on-control position.

In detail, as shown in FIG. 4 to FIG. 6, the electromagnetic switching valve 45 includes a cylindrical valve body 51 inserted into and fixed to a holding hole 50 of the cylinder block 49, a spool valve body 53 slidably mounted inside a valve hole 52 in the valve body 51 to switch flow path, and a proportional solenoid electromagnetic actuator 54 for operating the spool valve body 53.

The valve body 51 includes a supply port 55 through formed at the substantially central position of the peripheral wall thereof to communicate a downstream end of the supply passage 43 with the valve hole 52, and first and second ports 56 and 57 through formed at both sides of the supply port 55 to communicate the other ends of the first oil pressure passage 41 and the second oil pressure passage 42 with the valve hole 52. At both ends of the peripheral wall, third and fourth ports 58 and 59 are through formed to communicate both drain passages 44a and 44b with the valve hole 52.

The spool valve body 53 includes a substantially cylindrical first valve portion 60 for opening and closing the supply port 55 at the center of a small diameter axis portion thereof, and substantially cylindrical second and third valve portions 61, 62 at both end portions thereof for opening and closing the third and fourth ports 58, 59. The spool valve body 53 is urged in the right direction of the figure by a conical valve spring 63 disposed in compressive state between a cap portion 53b in one end of a support axis 53a at the front end side thereof and a spring sheet 51a at an inner wall of the front end side of the valve hole 52 so that the supply port 55 and the second oil pressure passage 42 are in communication with each other by the first valve portion 60.

The electromagnetic actuator 54 is equipped with a core 64, a moving plunger 65, a coil 66, a connector 67 and the like. At the front end of the moving plunger is fixed a driving rod 65a pressing a cap portion 53b of the spool valve body 53.

The controller 48 detects present operating conditions (load, rotation) by signals from a rotation sensor 101 detecting an engine rotation speed and from an airflow meter 102 detecting an intake air amount, and also detects a rotation phase of the camshaft 2 relative to the crankshaft, that is, a relative rotation position of the cam sprocket 1 and the camshaft 2, by signals from a crank angle sensor 103 and a cam sensor 104.

The controller 48 controls the supply of electricity to the electromagnetic actuator 54 based on a duty control signal.

For example, when the controller 48 outputs a control signal (OFF signal) with a duty ratio of 0% to the electromagnetic actuator 54, the spool valve body 53 moves to the right position as shown in FIG. 4, that is, to a maximum right direction by spring force of the valve spring 63. By this movement, the first valve portion 60 opens an opening end 55a of the supply port 55 for communicating with the second port 57 and at the same time the second valve portion 61 opens an opening end of the third port 58 and the fourth valve portion 62 closes the fourth port 59. Therefore, operating oil supplied under pressure from the oil pump 47 is sent to the retard angle side oil pressure chamber 33 through the supply port 55, the valve port 52, the second port 57 and the second oil pressure passage 42. Also, operating oil of the advanced angle side oil pressure chamber 32 is discharged to the oil pan 46 from the first drain passage 44a through the first oil pressure passage 41, the first port 56, the valve hole 52, and the third port 58.

Accordingly, an inner pressure of the retard angle side oil pressure chamber 33 becomes high and that of the advanced angle side oil pressure chamber 32 becomes low, thus the rotation member 3 rotates in one direction at a maximum through the vanes 28a to 28d. Thereby, the cam sprocket 1 and the camshaft 2 relatively rotate to one side and change their phases. As a result, an opening time of the intake valve is delayed and overlapping with the exhaust valve gets smaller.

On the other hand, when the controller 48 outputs a control signal (ON signal) with a duty ratio of 100% to the electromagnetic actuator 54, the spool valve body 53 slides in the left direction at a maximum against a spring force of the valve spring 63 as shown in FIG. 6. Consequently, the third valve portion 61 closes the third port 58, and at the same time the fourth valve portion 62 opens the fourth valve port 59 and the first valve portion 60 communicates the supply port 55 with the first port 56. Therefore, the operating oil is supplied to the advanced angle side oil pressure chamber 32 through the supply port 55, the first port 56, and the first oil pressure passage 41, while the operating oil of the retard angle side oil pressure chamber 33 is discharged to the oil pan 46 through the second oil pressure passage 42, the second port 57, the fourth port 59, and the second drain passage 44b. As a result, the oil pressure of the retard angle side oil pressure chamber 33 gets lower.

Therefore, the rotation member 3 rotates in the other direction at a maximum through the vanes 28a to 28d, by which the cam sprocket 1 and the camshaft 2 relatively rotate to the other side and change their phases. As a result, the opening timing of the intake valve gets earlier (advanced) and overlapping with the exhaust valve gets larger.

The controller 48 sets, as a base duty ratio BASEDUTY) the duty ratio at the position where the first valve portion 60 closes the supply port 55, the third valve portion 61 closes the third port 58, and the fourth valve portion 62 closes the fourth port 59. On the other hand, the controller 48 sets a feedback correction component UDTY as described later, by a sliding mode control, to coincide the relative rotation position (rotation phase: control object amount) between the cam sprocket 1 and the camshaft 2 detected based on signals from the crank angle sensor 103 and the cam sensor 104 with a target value (target advance angle value) of the relative rotation position (rotation phase) set corresponding to operating conditions. The controller 48 also sets, as a final duty ratio VTCDTY, a result of adding the base duty ratio BASEDTY and the feedback correction component UDTY and outputs a control signal of the duty ratio VTCDTY to the electromagnetic actuator 54.

In addition, the base duty ratio BASEDTY is set to about a central value (for example, 50%) in the duty ratio range within which the supply port 55, the third port 58 and the fourth port 59 all close and there is no supply and no discharge of oil in both of the oil pressure chambers 32, 33.

Namely, in the case the relative rotation position (rotation phase) is required to be changed into the retard angle direction, the duty ratio is decreased by the feedback correction component UDTY, the operating oil sent under pressure from the oil pump 47 is supplied to the retard angle side oil pressure chamber 33, and the operating oil of the advanced angle side oil pressure chamber 32 is discharged to the oil pan 46. On the other hand, in the case the relative rotation position (rotation phase) is required to be changed into the advanced angle direction, the duty ratio is increased by the feedback correction component UDTY, the operating oil is supplied to the advanced angle side oil pressure chamber 32, and the operating oil of the retard angle side oil pressure chamber 33 is discharged to the oil pan 46. In the case of holding the relative rotation position at the current state, with the reduction of an absolute value of the feedback correction component UDTY, the duty ratio is controlled to be back close to the base duty ratio, and the inner pressure of each of the oil pressure chambers 32, 33 are controlled to be held by closing of the supply port 55, the third port 58, and the fourth port 59 (cease of supply and discharge of oil pressure).

The feedback correction amount UDTY (operation amount) is calculated by the sliding mode control as follows. In this description, the relative rotation position (rotation phase) between the cam sprocket 1 and the camshaft 2 to be detected will be explained as an actual angle of the valve timing control apparatus (VTC) and its target value will be explained as a target angle of the VTC.

Figure 7:
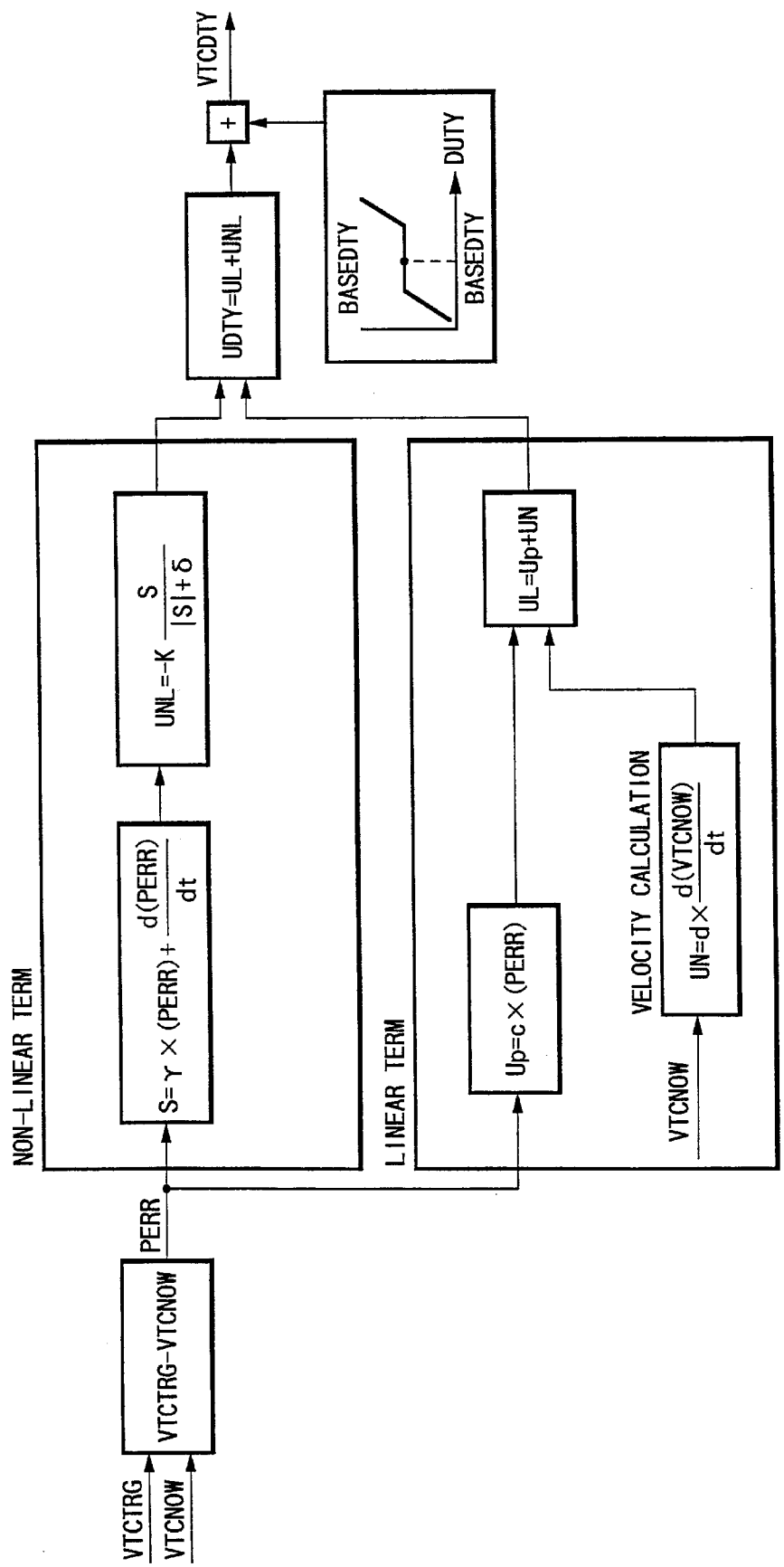
FIG. 7 is a control block diagram of the above valve timing control mechanism.

FIG. 7 is a block diagram showing a state of the duty control of the electromagnetic actuator 54 by the above controller 48 to which the sliding mode control is applied.

An error amount PERR being a deviation between the target angle VTCTRG and the actual angle VTCNOW is calculated. Then, a proportional operation amount $U_P$ ($U_P = c \times (PERR)$) obtained by multiplying the error amount PERR by P component gain c is added with a velocity operation amount $U_N$ obtained by multiplying a differential value of the actual angle VTCNOW (d(VTCNOW)/dt) by a velocity gain d ($U_N = d \times (d(VTCNOW)/dt)$) to calculate a linear term operation amount $U_L$ ($U_L = U_P + U_N$).

Further, a value obtained by multiplying the error amount PERR by an inclination γ is added to the differential value d(PERR)/dt of the error amount PERR to calculate a switching function S ($S = \gamma \times (PERR) + d(PERR)/dt$), so that a non-linear term operation amount $U_{NL}$ as a smoothing function $-kS$ ($|S| + \delta$) using the switching function S.

Here, in the smoothing function, k is a non-linear term gain and δ is a chattering prevention coefficient.

The above linear term operation amount $U_L$ functions to move a state of the control system (VTC) toward the target value along a switching line (S=0). The non-linear term operation amount $U_{NL}$ functions to have the state approach the switching line (S=0) to be fixed on the switching line (S=0). Thereby, the system state is made to approach from an initial state onto the switching line (S=0) on a phase plane, and when the system state is on the switching line (S=0), the system state reaches an original point (target value) while being fixed on the switching line (S=0). (To be referred to FIG. 8)

The linear term operation amount $U_L$ and the non-linear term operation amount $U_{NL}$ are added to calculate the feedback correction component UDTY and the calculated feedback correction component UDTY is added to the base duty ratio BASEDTY equivalent to the above dead band neutral position, to be output as the final duty ratio VTCDTY.

Thus, since the feedback correction amount is calculated by the sliding mode control, a feedback gain is switched to lead the system state on the preset switching line S=0, the control with a high robust can be executed without influence of disturbances by variations in dead band of the switching valve, oil temperature and oil pressure, thereby reducing the machining precision and processing const.

In particular, by setting the switching function S as a function of the error amount, an operation amount (non-linear term operation amount) can be given according to the error amount, resulting in that a complicate dither control to go beyond the operation dead band of the switching valve (spool valve) is no longer needed and the capacities of the ROM and RAM can be reduced. Further, conventional matching is required for both PID control and dither control, but, according to the invention, the matching is required for the sliding mode control only. Therefore, an adaptation time is reduced.

Next, an abnormality diagnosis in a feedback control system for a valve timing by the above sliding mode control will be explained.

Figure 9:
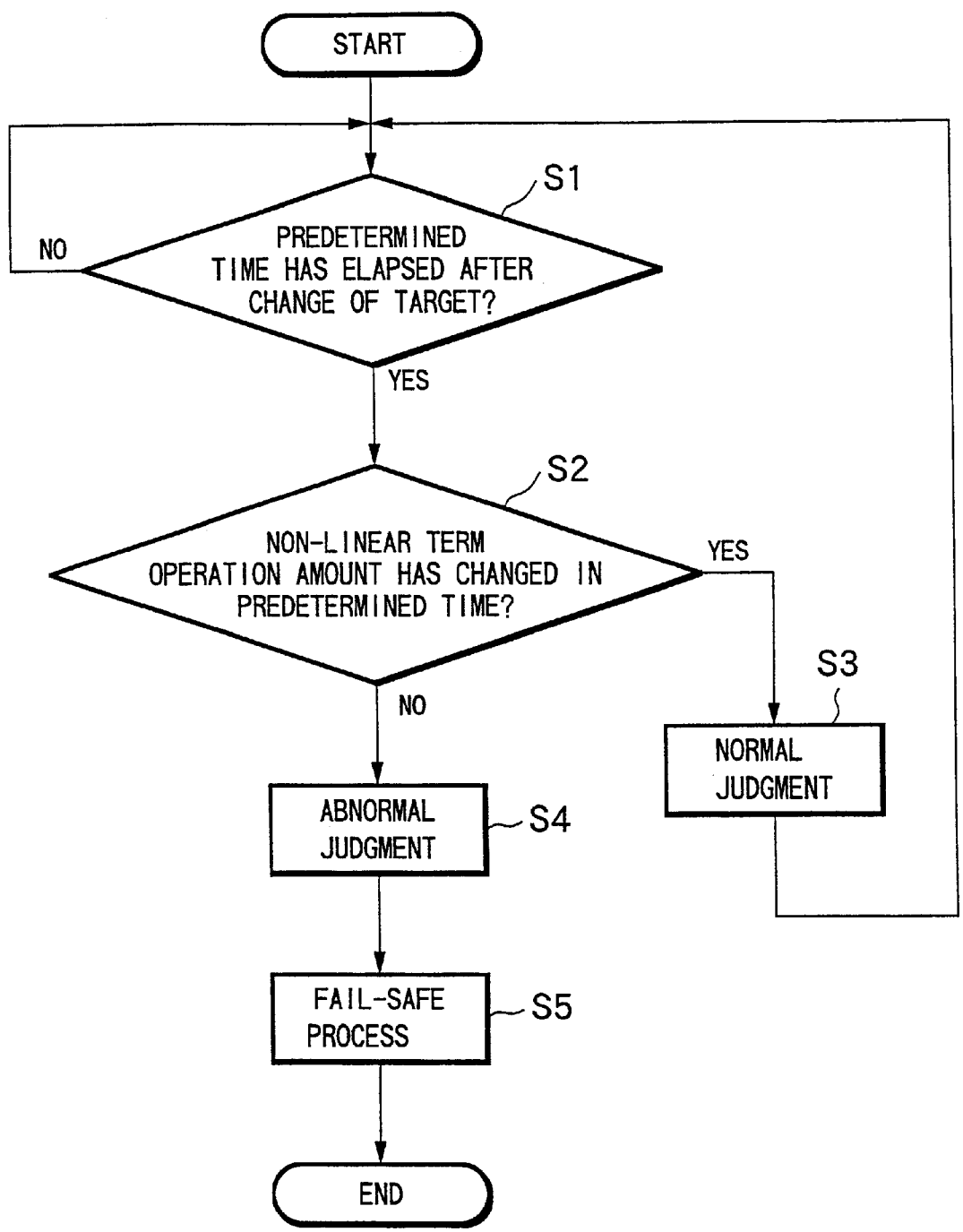
FIG. 9 is a flowchart showing a first embodiment of an abnormality diagnosis in the sliding mode control system.

A flowchart in FIG. 9 illustrates a first embodiment of abnormality diagnosis. In step S1, it is judged whether or not a predetermined time has elapsed from when a target value has changed. This predetermined time is set in advance as a time until the system state reaches on the switching line (S=0) from when the target value has changed.

Further, instead of judgment of the above time elapse, a time until a change amount of the crank angle (accumulated rotation number) reaches a predetermined value or above from when the target value has changed may be judged.

Figure 8:
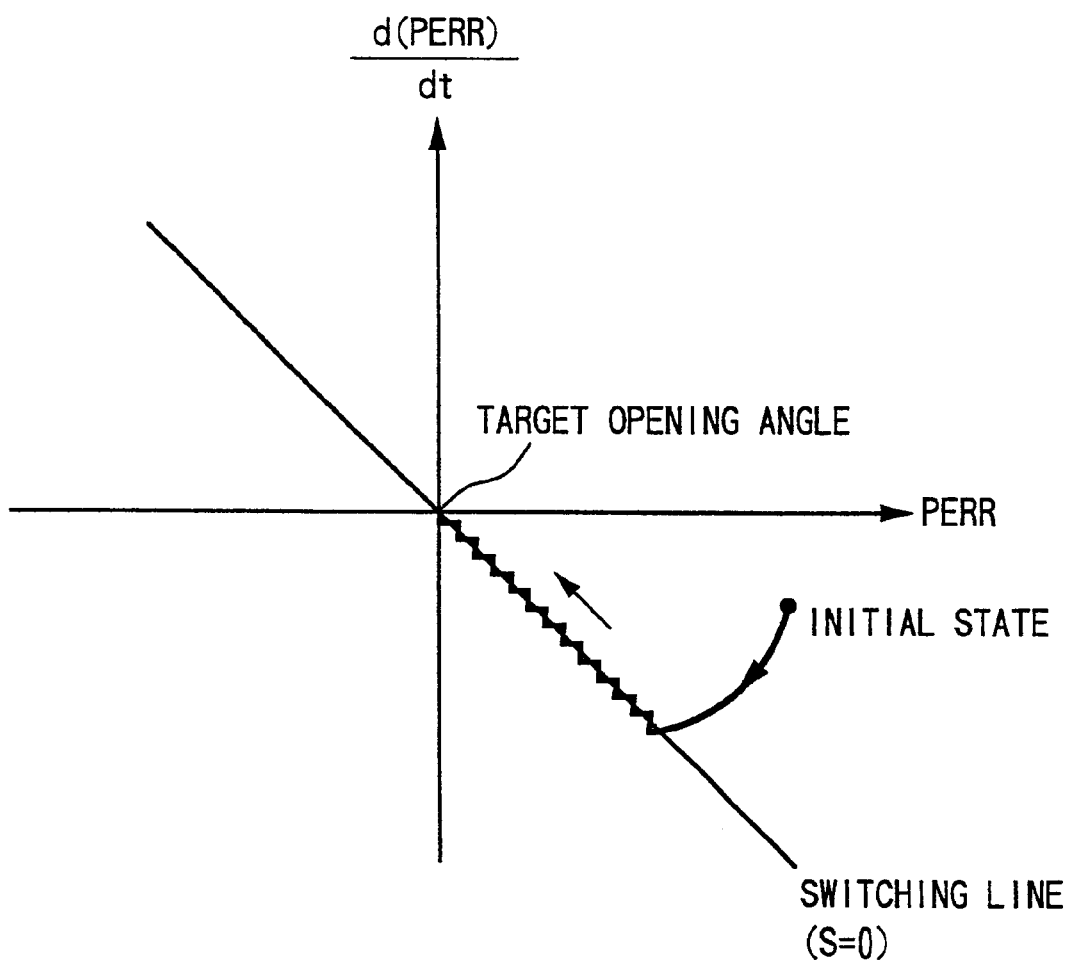
FIG. 8 is a diagram showing a state of convergence to a target angle of the above valve timing control apparatus in a sliding mode control.

In step S2, it is judged whether or not the non-linear term operation amount $U_{NL}$ has changed by a predetermined value or above within a predetermined time. In the sliding mode control, as shown in FIG. 8, when the system state reaches on the switching line (S=0), then the non-linear term operation amount $U_{NL}$ performs a switching operation to repeat the reversion of code to fix the system state on the switching line (S=0) and the system state reaches the original point (target value) while sliding bindingly on the switching line (S=0). Accordingly, it can be judged whether or not the feedback control system operates normally based on whether or not the non-factor operation amount $U_{NL}$ performs the switching operation to repeat the reversion of code.

Therefore, in step S2, the switching operation of the non-linear term operation amount $U_{NL}$ is judged as the presence of change within a predetermined time. If a change showing the switching operation is recognized, the process goes to step S3, wherein it is judged that the feedback control system is normal to output a normal judgment signal.

On the other hand, when since a change amount of the non-linear term operation amount $U_{NL}$ is small, the normal switching operation is not recognized, there is assumed the rotation phase is fixed due to the sticking of the switching valve. Then the process goes to step S4 wherein the feedback control system is judged as abnormal to output an abnormality judgment signal.

In step S5, a predetermined fail-safe process is executed upon receiving the output of the abnormality judgment signal. The above fail-safe process includes a warning of malfunction, prohibition of rotation phase control, an output of a predetermined fail-safe duty signal and so on.

Figure 10:
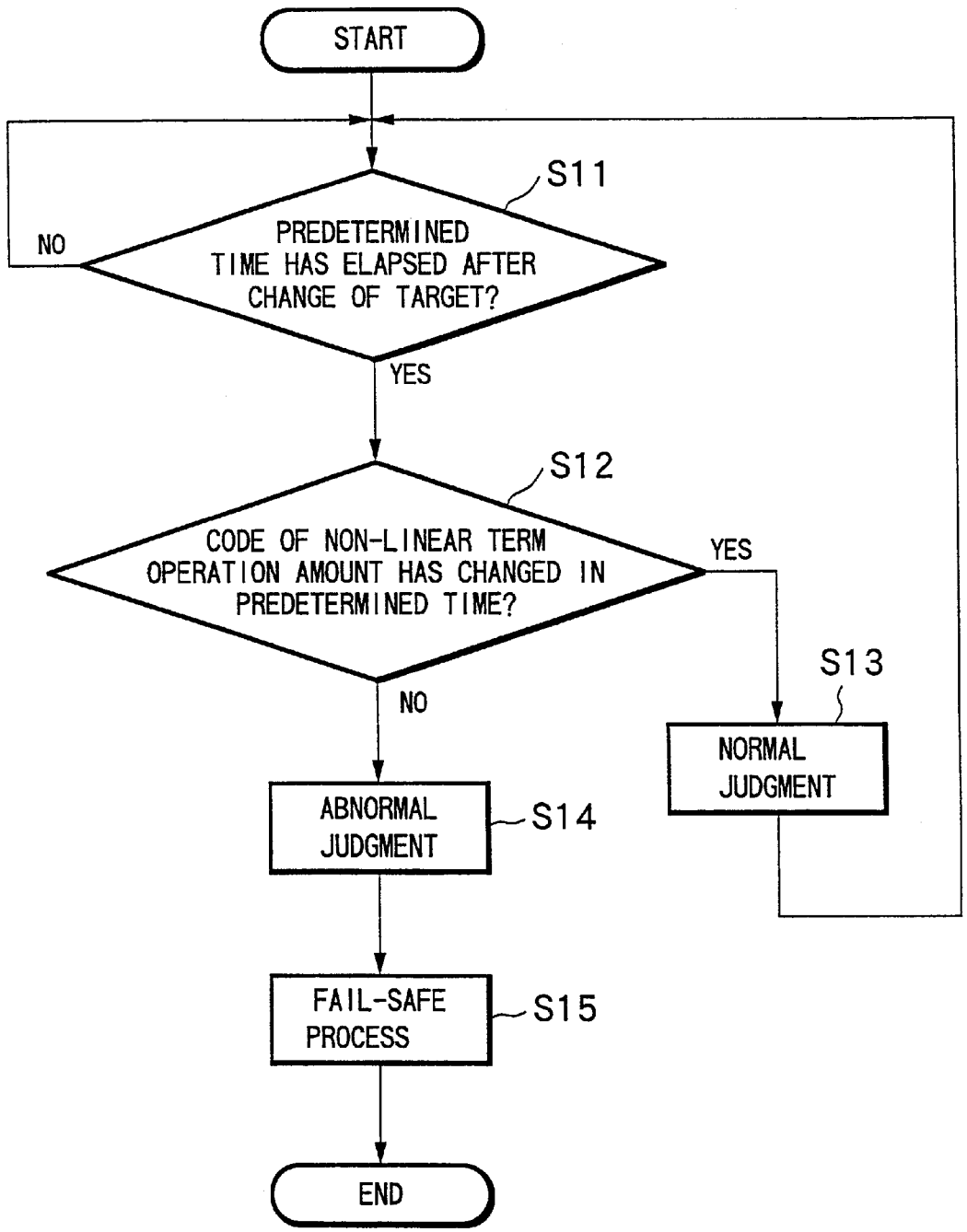
FIG. 10 is a flowchart showing a second embodiment of an abnormality diagnosis in the sliding mode control system.

A flowchart of FIG. 10 shows a second embodiment of abnormality diagnosis. In the first embodiment shown in the flowchart of FIG. 9, it is judged whether or not the switching operation of the non-linear term operation amount $U_{NL}$ is carried out based on the change in the amount of the non-linear term operation amount $U_{NL}$. In the abnormality diagnosis in the flowchart of FIG. 11, it is judged whether or not the switching operation is carried out normally based on the reversion of code of the non-linear term operation amount $U_{NL}$.

If a predetermined time elapse (or the rotation for only a predetermined crank angle change amount) after a target value has changed is judged. The process goes to step S12 wherein it is judged that the non-linear term operation amount $U_{NL}$ performs the switching operation normally by judging whether or not the code of non-linear term operation amount $U_{NL}$ is reversed within a predetermined time.

If the code of non-linear term operation amount $U_{NL}$ is reversed within the predetermined time, it is judged that the non-linear term operation amount $U_{NL}$ performs the switching operation normally. Then, the process goes to step S13, the normality judgment signal is output.

On the other hand, if the code of non-linear term operation amount $U_{NL}$ is not reversed within the predetermined time, it is judged that the non-linear term operation amount $U_{NL}$ does not perform the switching operation normally. Then, the process goes to step S14 wherein the abnormality judgment signal is output. In the next step S15, a fail-safe process is carried out.

Figure 11:
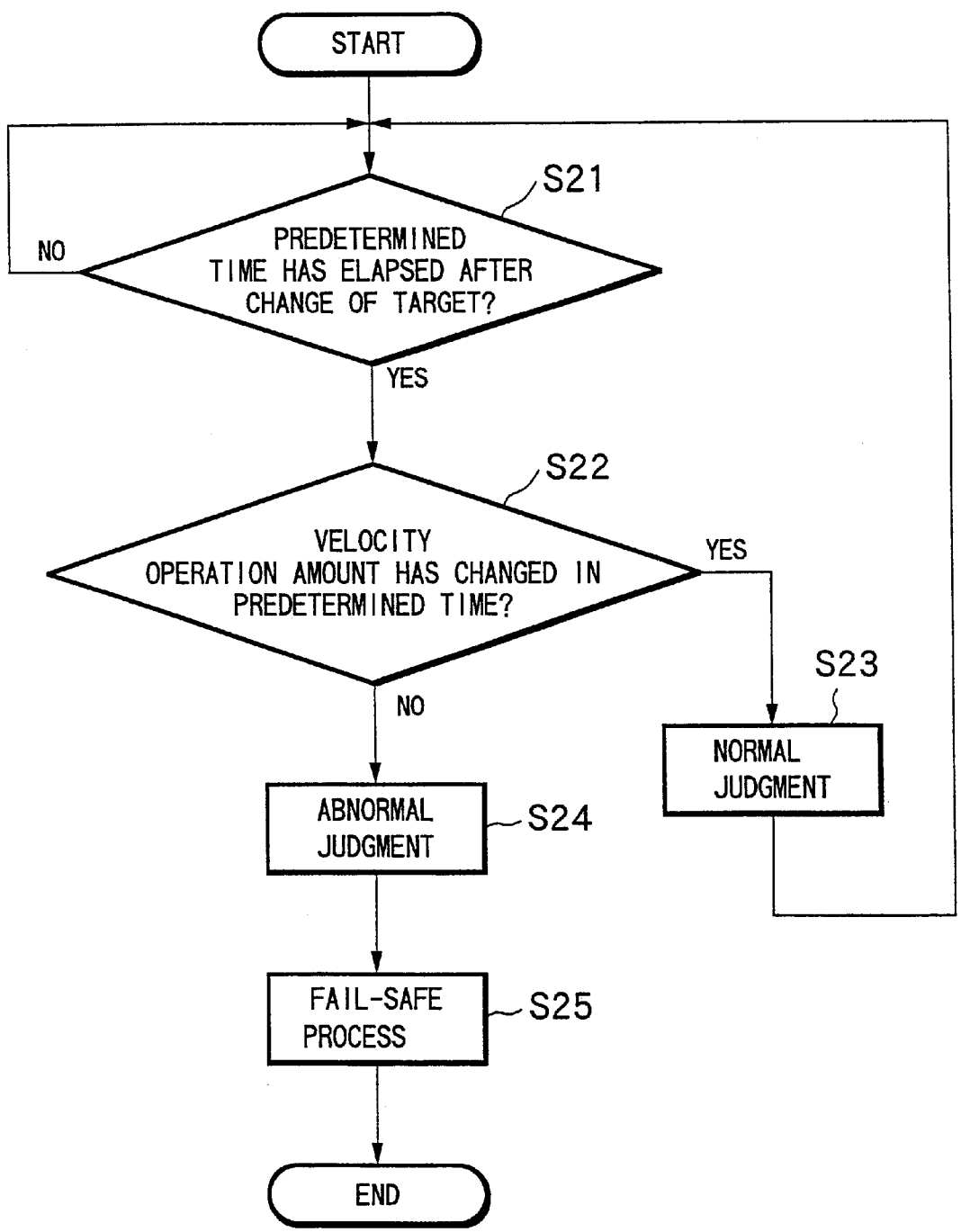
FIG. 11 is a flowchart showing a third embodiment of an abnormality diagnosis in the sliding mode control system.

A flowchart in FIG. 11 shows a third embodiment of abnormality diagnosis. In step S21, if a predetermined time elapse (or the rotation for only a predetermined crank angle change amount) after a target value has changed is judged, the process goes to step S22 wherein it is judged whether or not a velocity operation amount $U_N$ of the linear term operation amount $U_L$ has changed for a predetermined value within a predetermined time.

When the feedback control function making the rotation phase close to a target is carried out normally, the velocity operation amount $U_N$ changes by a change of the rotation phase. Therefore, if the velocity operation amount $U_N$ changes within a predetermined time, it can be judged that the feedback control functions normally. In such a case, the process goes to step S23 wherein the normal judgment signal is output.

On the other hand, when the velocity operation amount $U_N$ does not change within the predetermined time, it shows the state the rotation phase does not approach a target value and is fixed. Then, the process goes to step S24 wherein the abnormality judgment signal is output. In the next step S25, the failsafe process is carried out.

Figure 12:
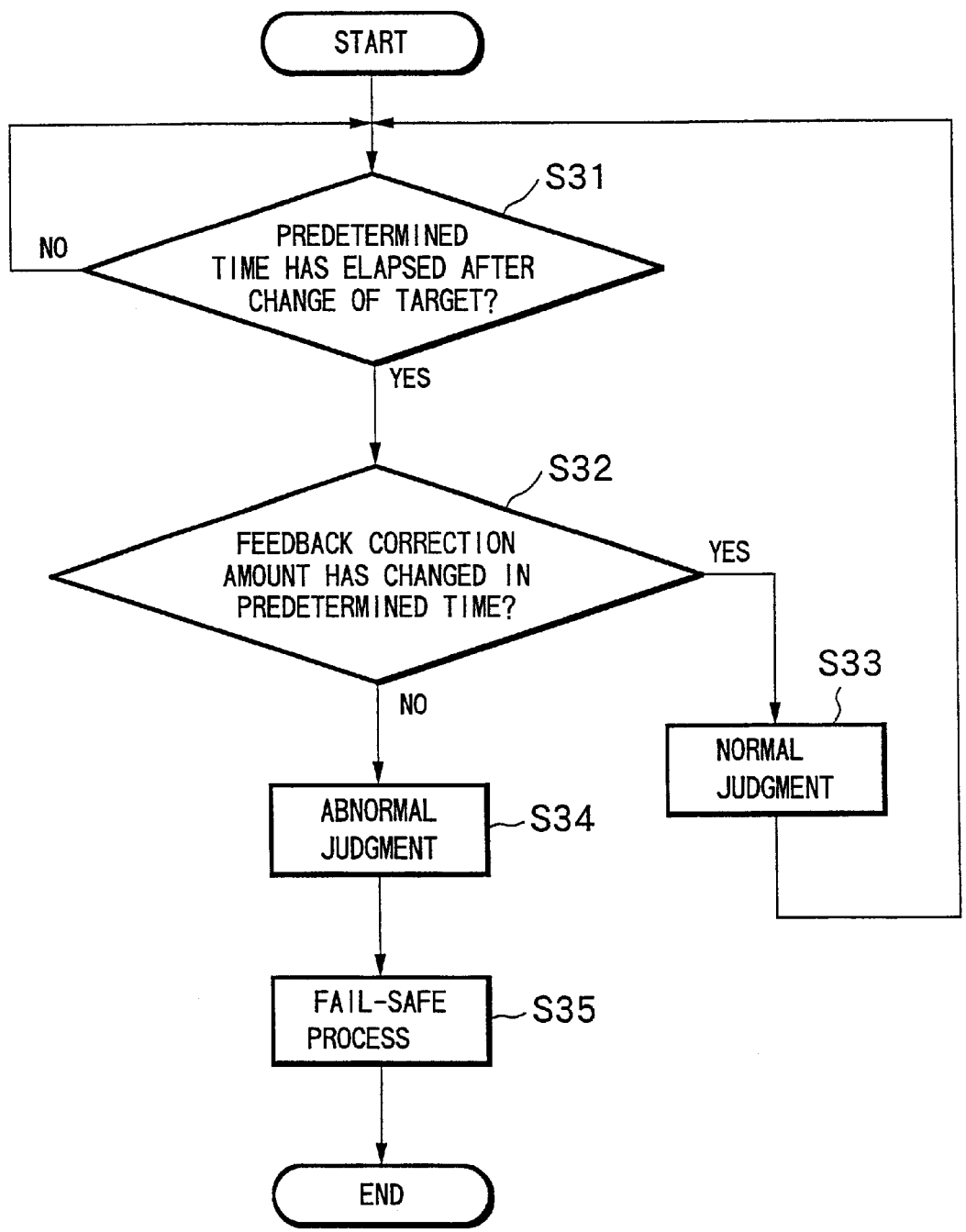
FIG. 12 is a flowchart showing a fourth embodiment of an abnormality diagnosis in the sliding mode control system.

A flowchart in FIG. 12 shows a fourth embodiment of abnormality diagnosis. In step S31, if a predetermined time elapse (or the rotation for only a predetermined crank angle change amount) after a target value has changed is judged, then in step S32, it is judged whether or not the feedback correction amount UDTY obtained by adding the linear term operation amount $U_L$ and the non-linear term operation amount $U_{NL}$ has changed for a predetermined value or above within a predetermined time.

When the feedback control function making the rotation phase close to a target is carried out normally, as described before, the non-linear term operation amount $U_{NL}$ performs the switching operation and the velocity operation amount $U_L$ of the linear term operation amount $U_N$ changes, so that the feedback correction amount UDTY changes. Therefore, if the feedback correction amount UDTY changes within the predetermined time, it can be judged that the feedback control is carried out normally. In such a case, the process goes to step S33 wherein the normal judgment signal is output.

On the other hand, when the feedback correction amount UDTY does not change within the predetermined time, there is assumed that the rotation phase fixation occurs. The process goes to step S34 wherein the abnormality judgment signal is output. In the next step S35, a fail-safe process is carried out.

As described above, in the diagnosis based on a change or a code reversion of the non-linear term operation amount $U_{NL}$, a change of the velocity operation amount $U_N$ or a change of the feedback correction amount UDTY, even when an actual angle (an actual rotation phase) has a stationary deviation from a target value due to disturbances (oil temperature, oil pressure), setting of conditions for abnormality diagnosis is possible without giving the abnormality judgment conditions a room to cover such a deviation to thereby perform an abnormality diagnosis with high accuracy.

Further, a variety of combinations of abnormality diagnosis in the first embodiment to the fourth embodiment may be made.

In the above embodiments, the abnormality diagnosis is performed in the feedback control of the vane type valve control apparatus, however, the diagnosis apparatus according to the present invention is not limited to a valve timing control apparatus but can be widely applied to a sliding mode control system to feedback control a control object amount to a target value by calculating an operation amount based on the sliding mode control.

The entire content of Japanese Patent Application No. 11-311557 filed on Nov. 1, 1999 is incorporated herein by the reference.

What is claimed is:

1. An apparatus for diagnosing a sliding mode control system in which an operation amount is calculated based on a non-linear term calculated corresponding to a switching function and a linear term, to feedback control a control object amount to a target value, said apparatus comprising;

abnormal judgment signal output means for outputting an abnormal judgment signal of said sliding mode control system based on a change of said operation amount within a predetermined time from when a predetermined period of time has elapsed after said target value has changed.

2. The apparatus for diagnosing a sliding mode control system according to claim 1, wherein said abnormality judgment signal output means outputs said abnormality judgment signal when the operation amount by said non-linear term does not change in the predetermined time from when the predetermined period of time has elapsed after said target value has changed.

3. The apparatus for diagnosing a sliding mode control system according to claim 1, wherein said abnormality judgment signal output means outputs said abnormality judgment signal when a code of the operation amount by said non-linear term does not change in the predetermined time from when the predetermined period of time has elapsed after said target value has changed.

4. The apparatus for diagnosing a sliding mode control system according to claim 1, wherein said linear term comprises an operation amount in proportion to a control deviation and an operation amount in proportion to a change velocity of the control object amount, and said abnormal judgment signal output means outputs said abnormal judgment signal when the operation amount in proportion to the change velocity of said control object amount does not change in the predetermined time from when the predetermined period of time has elapsed after said target value has changed.

5. The apparatus for diagnosing a sliding mode control system according to claim 1, wherein said sliding mode control system is a system for feedback controlling a valve timing in a variable valve timing apparatus of an internal combustion engine to a target value.

6. A method of diagnosing a sliding mode control system in which an operation amount is calculated based on a non-linear term calculated corresponding to a switching function and a linear term, to feedback control a control object amount to a target value, said method comprising the steps of:

detecting a time when a predetermined period of time has elapsed after said target value has changed;

judging if said predetermined period of time is within a predetermined time from the elapsed time; and outputting an abnormal judgment signal of said sliding mode control system based on a change of said operation amount in said predetermined time.

7. The method of diagnosing a sliding mode control system according to claim 6, wherein said step of outputting an abnormal judgment signal outputs said abnormal judgment signal when the operation amount by said non-linear term does not change in said predetermined time.

8. The method of diagnosing a sliding mode control system according to claim 6, wherein said step of outputting an abnormal judgment signal outputs said abnormal judgment signal when a code of the operation amount by said non-linear term does not change in said predetermined time.

9. The method of diagnosing a sliding mode control system according to claim 6, wherein said linear term comprises an operation amount in proportion to a control deviation and an operation amount in proportion to a change velocity of the control object amount.

10. The method of diagnosing a sliding mode control system according to claim 6, wherein said sliding mode control system is a system for feedback controlling a valve timing in a variable valve timing apparatus of an internal combustion engine to a target value.

* * * * *